(12) United States Patent
Adkisson et al.

(10) Patent No.: US 8,009,216 B2
(45) Date of Patent: Aug. 30, 2011

(54) PIXEL SENSOR CELL WITH FRAME STORAGE CAPABILITY

(75) Inventors: James W. Adkisson, Jericho, VT (US); John J. Ellis-Monaghan, Grand Isle, VT (US); Rajendran Krishnasamy, Essex Junction, VT (US); Solomon Mulugeta, Essex Junction, VT (US); Charles F. Musante, South Burlington, VT (US); Richard J. Rassel, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 12/174,289

(22) Filed: Jul. 16, 2008

(65) Prior Publication Data

US 2010/0013973 A1 Jan. 21, 2010

(51) Int. Cl.
*H04N 3/14* (2006.01)
*H04N 5/335* (2011.01)

(52) U.S. Cl. ..................................... 348/308; 250/208.1
(58) Field of Classification Search .................. None
See application file for complete search history.

(56) References Cited

U.S. PATENT DOCUMENTS

| 5,355,165 | A | * | 10/1994 | Kosonocky et al. | .......... 348/311 |
| 5,471,515 | A |   | 11/1995 | Fossum et al. | |
| 5,937,025 | A | * | 8/1999 | Smith | .............................. 377/63 |
| 6,501,506 | B1 | * | 12/2002 | Miura | ............................ 348/308 |
| 7,538,307 | B1 | * | 5/2009 | Lauxtermann | ................ 250/207 |
| 2001/0016064 | A1 |   | 8/2001 | Tsuruoka et al. | |
| 2001/0040634 | A1 | * | 11/2001 | Ueno | ............................ 348/303 |
| 2005/0216667 | A1 | * | 9/2005 | Cabot et al. | ..................... 711/118 |
| 2005/0219884 | A1 | * | 10/2005 | Manabe et al. | .................. 365/10 |
| 2006/0044437 | A1 | * | 3/2006 | Shah | .............................. 348/308 |
| 2007/0165123 | A1 | * | 7/2007 | Panicacci | ....................... 348/294 |
| 2007/0176213 | A1 | * | 8/2007 | Oda | .............................. 257/247 |
| 2008/0074523 | A1 | * | 3/2008 | Panicacci | ....................... 348/308 |
| 2009/0122173 | A1 | * | 5/2009 | Tennant et al. | ............... 348/308 |
| 2009/0160989 | A1 | * | 6/2009 | Lauxtermann | ................ 348/308 |

OTHER PUBLICATIONS

Lauxtermann et al., "Comparison of Global Shutter Pixels for CMOS Image Sensors", Paper at 2007 International Image Sensor Workshop, pp. 82-85.
Yang et al., "A Snap-Shot CMOS Active Pixel Imager for Low-Noise, High-Speed Imaging", 1998 IEDM, pp. 45-48.
U.S. Office Action dated Sep. 29, 2010 issued in U.S. Appl. No. 12/174,264.

\* cited by examiner

*Primary Examiner* — Lin Ye
*Assistant Examiner* — Dennis Hogue
(74) *Attorney, Agent, or Firm* — Scully, Scott, Murphy & Presser, P.C.; Anthony J. Canale

(57) ABSTRACT

A set of frame transfer transistors are provided between a hold gate transistor and a transfer gate transistor of a CMOS image sensor to enable storage of charge generate in the photosensitive diode after exposure. The readout of the charges from the set of frame transfer transistors may be performed after a plurality of exposures of the CMOS image sensor, between each of which charges are shifted toward the transfer gate transistor within the set of frame transfer transistors. Useful operation modes are enabled including a burst mode operation for rapid capture of successive images and high dynamic range operations in which multiple images are taken with different exposure times or a large capacitance is provided by ganging the diffusions of the set of frame transfer transistors.

17 Claims, 9 Drawing Sheets

PIXEL SENSOR CELL WITH FRAME STORAGE CAPABILITY

RELATED APPLICATIONS

The present application is related to co-pending U.S. application Ser. No. 12/174,264, which is incorporated herein by reference.

FIELD OF THE INVENTION

The present invention relates to semiconductor circuits and semiconductor circuit design, and more particularly to semiconductor circuits including a pixel sensor cell having the capability of storing frames prior to read out, and a design structure for the same.

BACKGROUND OF THE INVENTION

A pixel sensor comprises an array of pixel sensor cells that detects two dimensional signals. Pixel sensors include image sensors, which may convert a visual image to digital data that may be represented by a picture, i.e., an image frame. The pixel sensor cells are unit devices for the conversion of the two dimensional signals, which may be a visual image, into the digital data. A common type of pixel sensors includes image sensors employed in digital cameras and optical imaging devices. Such image sensors include charge-coupled devices (CCDs) or complementary metal oxide semiconductor (CMOS) image sensors.

While complementary metal oxide semiconductor (CMOS) image sensors have been more recently developed compared to the CCDs, CMOS image sensors provide an advantage of lower power consumption, smaller size, and faster data processing than CCDs as well as direct digital output that is not available in CCDs. Also, CMOS image sensors have lower manufacturing cost compared with the CCDs since many standard semiconductor manufacturing processes may be employed to manufacture CMOS image sensors. For these reasons, commercial employment of CMOS image sensors has been steadily increasing in recent years.

The image of an image sensor may be captured employing a "rolling shutter method." In the rolling shutter method, the imaged is captured on a row-by-row basis within a pixel array, i.e., the image is captured contemporaneously for all pixels in a row, but the capture of the image is not contemporaneous between adjacent rows. Thus, the precise time of the image capture is the same only within a row, and is different from row to row. For highly dynamic subjects (such as objects moving at a high rate of speed), the rolling shutter methodology can create image artifacts.

To avoid such degradation of image quality, the image of an image sensor may be captured employing an "electronic global shutter method." The global shutter method simulates a mechanical shutter using a global shutter operation, in which the image for the whole frame is captured at the almost exactly the same time for all the rows and columns. The signal, in photogenerated carriers, is then transferred to a corresponding floating diffusion node. The voltage at the floating diffusion nodes is read out of the imager array on a row-by-row basis. The global shutter method enables image capture of high speed subjects without image artifacts, but introduces a concern with the global shutter efficiency of the pixel since the integrity of the signal may be compromised by any charge leakage from the floating diffusion node between the time of the image capture and the time of the reading of the imager array.

In either operation mode, the image captured in the image sensor needs to be read out by a sensing circuitry that converts the charge generated in the photosensitive diode of each pixel to a digital output signal row by row. Typical image sensors have an image array size of 640×480 pixels, and array sizes exceeding 1024×1024 pixels are common in the industry. A typical readout time for a frame is from about 10 ms to 100 ms due to the large number of rows in the array size. Such a limitation on the readout time prevents capture of another image within the readout time, i.e., the image sensor may not capture another image during the readout time since the array of pixels must unload the data from the previously captured image frame before the image sensor can be ready to capture the next frame.

In view of the above, there exists a need for a CMOS image sensor with a "burst mode" operation capability, in which a plurality of successive images may be captured without interruption.

Further, the dynamic range of a CMOS image sensor pixel is finite. Capture of an image with a dynamic range exceeding the dynamic range of the image sensor pixels inevitably results in loss of information in pixels corresponding to extreme values of data. In addition, the extended dynamic range may be employed to reduce signal noise in the image.

Therefore, there exists a need for a CMOS image sensor with an extended dynamic range and/or reduced signal noise in the image, and design structures for the same.

SUMMARY OF THE INVENTION

To address the needs described above, the present invention provides a CMOS image sensor pixel incorporating a set of frame transfer transistors that enable storage of data for at least one frame between a hold gate transistor and a transfer gate transistor.

In the present invention, a set of frame transfer transistors are provided between a hold gate transistor and a transfer gate transistor of a CMOS image sensor to enable storage of charge generate in the photosensitive diode after exposure. The readout of the charges from the set of frame transfer transistors may be performed after a plurality of exposures of the CMOS image sensor, between each of which charges are shifted toward the transfer gate transistor within the set of frame transfer transistors. Useful operation modes are enabled including a burst mode operation for rapid capture of successive images and high dynamic range operations in which multiple images are taken with different exposure times or a large capacitance is provided by ganging the diffusions of the set of frame transfer transistors.

Further, a design structure for designing, manufacturing, or testing a design for a CMOS image sensor pixel is provided. The design structure includes data for a photosensitive diode, a global reset transistor, and a hold gate transistor, a transfer gate transistor, a reset gate transistor, a source follower transistor, and a row select transistor. The design structure further includes data for a set of frame transfer transistors to be formed between the hold gate transistor and the transfer gate transistor to enable storage of charge generate in the photosensitive diode after exposure. The readout of the charges from the set of frame transfer transistors may be performed after a plurality of exposures of the CMOS image sensor, between each of which charges are shifted toward the transfer gate transistor within the set of frame transfer transistors. Useful operation modes are enabled including a burst mode operation for rapid capture of successive images and high dynamic range operations in which multiple images are taken with different exposure times or a large capacitance is provided by ganging the diffusions of the set of frame transfer transistors.

According to an aspect of the present invention, a semiconductor structure for an image sensor pixel is provided. The semiconductor structure comprises:

a photosensitive diode structure;

a first transistor including a diffusion region and a first channel, wherein the diffusion region is a source region of the first transistor and is of integral construction with a terminal of the photosensitive diode structure;

a second transistor including a second channel located in proximity to the first channel, wherein the second channel is electrically coupled to the first channel to enable formation of a merged channel including the first channel and the second channel; and a plurality of frame transfer transistors including a plurality of frame transfer channels, wherein each of the plurality of frame transfer transistors is serially connected among one another and comprises a gate electrode and a frame transfer channel, and wherein each of the plurality of frame transfer channels is located in proximity with another of the plurality of frame transfer channels to enable formation of a merged channel including two neighboring frame transistor channels.

In one embodiment, the semiconductor structure further comprises a set of four metal lines and a set of metal vias, wherein each of the set of four metal lines connects gate electrodes of every fourth frame transfer transistor among the plurality of frame transfer transistors through a subset of the metal vias, and wherein each of the four metal lines connects a different subset of the plurality of frame transfer transistors.

In another embodiment, the semiconductor structure further comprises a set of three metal lines and a set of metal vias, wherein each of the set of three metal lines connects gate electrodes of every third frame transfer transistor among the plurality of frame transfer transistors through a subset of the metal vias, and wherein each of the three metal lines connects a different subset of the plurality of frame transfer transistors.

In even another embodiment, the semiconductor structure further comprises a global reset transistor including a global reset transistor source region directly connected to the terminal of the photosensitive diode and a global reset transistor drain region directly connected to a power supply source.

In yet another embodiment, the semiconductor structure further comprises:

a transfer gate transistor including a transfer gate channel located in proximity with a last frame transfer channel to enable formation of another merged channel including the last frame transistor channel and the transfer gate channel; and a source follower transistor including a source follower transistor gate electrode connected to the floating diffusion region by a set of metal interconnect structures.

In still another embodiment, the semiconductor structure further comprises:

another photosensitive diode structure;

a third transistor including another diffusion region and a third channel, wherein the other diffusion region is a source region of the third transistor and is of integral construction with a terminal of the other photosensitive diode structure;

a fourth transistor including a fourth channel located in proximity to the third channel, wherein the fourth channel is electrically coupled to the third channel to enable formation of another merged channel including the third channel and the fourth channel; and another plurality of frame transfer transistors including another plurality of frame transfer channels, wherein each of the other plurality of frame transfer transistors is serially connected among one another and comprises a gate electrode and a frame transfer channel, and wherein each of the other plurality of frame transfer channels is located in proximity with another of the other plurality of frame transfer channels to enable formation of a merged channel including two neighboring frame transistor channels; and another transfer gate transistor including another transfer gate channel located in proximity with another last frame transfer channel to enable formation of another merged channel including the other last frame transistor channel and the other transfer gate channel.

According to another aspect of the present invention, a semiconductor circuit for an image sensor pixel is provided. The semiconductor circuit comprises:

a photosensitive diode;

a first transistor having a first channel, wherein a source of the first transistor is a terminal of the photosensitive diode;

a second transistor having a second channel which is configured to enable formation of a merged channel including the first channel and the second channel; and a plurality of frame transfer transistors including a plurality of frame transfer channels, wherein each of the plurality of frame transfer transistors is serially connected among one another and comprises a gate electrode and a frame transfer channel, and wherein each neighboring pair of the plurality of frame transfer channels is configured to enable formation of a merged channel including two neighboring frame transistor channels.

In one embodiments, gates of every fourth frame transfer transistor among the plurality of frame transfer transistors are electrically shorted, and wherein gates of adjoining frame transfer transistors are electrically disconnected.

In another embodiment, gates of every third frame transfer transistor among the plurality of frame transfer transistors are electrically shorted, and wherein gates of adjoining frame transfer transistors are electrically disconnected.

In even another embodiment, the semiconductor circuit of further comprises a global reset transistor, wherein a source of the global reset transistor is one terminal of the photosensitive diode and a drain of the global reset transistor drain is directly connected to a power supply source.

In yet another embodiment, the semiconductor circuit further comprises:

a transfer gate transistor including a transfer gate channel configured to enable formation of another merged channel including a last frame transistor channel and the transfer gate channel; and a source follower transistor, wherein a gate of the source follower transistor is directly connected to a drain of the transfer gate transistor.

In still another embodiment, the semiconductor circuit further comprises:

another photosensitive diode;

a third transistor having a third channel, wherein a source of the third transistor is a terminal of the other photosensitive diode;

a fourth transistor having a fourth channel which is configured to enable formation of another merged channel including the third channel and the fourth channel; and another plurality of frame transfer transistors including another plurality of frame transfer channels, wherein each of the other plurality of frame transfer transistors is serially connected among one another and comprises a gate electrode and a frame transfer channel, and wherein each neighboring pair of the other plurality of frame transfer channels is configured to enable formation of a merged channel including two neighboring frame transistor channels; and another transfer gate transistor including another transfer gate channel configured to enable formation of yet another merged channel including another last frame transistor channel and the other transfer gate channel.

According to yet another aspect of the present invention, a design structure embodied in a machine readable medium for designing, manufacturing, or testing a design is provided. The design structure comprises:

a first data representing a photosensitive diode;

a second data representing a first transistor in direct serial connection with the photosensitive diode, wherein the first transistor having a first channel, and wherein a source of the first transistor is a terminal of the photosensitive diode;

a third data representing a second transistor in direct serial connection with the first transistor, wherein the second transistor having a second channel configured to enable formation of a merged channel including the first channel and the second channel; and a fourth data representing a plurality of frame transfer transistors serially connected thereamongst and in direct serial connection with the second transistor.

In one embodiment, the design structure further comprises a fifth data, which may represent an electrical connection between gate electrodes of every fourth frame transfer transistor among the plurality of frame transfer transistors, wherein gates of adjoining frame transfer transistors are electrically disconnected, or may represent an electrical connection between gate electrodes of every third frame transfer transistor among the plurality of frame transfer transistors, wherein gates of adjoining frame transfer transistors are electrically disconnected.

In another embodiment, the design structure further comprises a sixth data representing a global reset transistor directly connected to the photosensitive diode a power supply source.

In even another embodiment, the design structure further comprises:

a seventh data representing a transfer gate transistor in direct serial connection with a plurality of frame transfer transistors; and an eighth data representing a source follower transistor, wherein a gate of the source follower transistor is directly connected to a drain of the transfer gate transistor.

In yet another embodiment, the design structure further comprises a ninth data representing another photosensitive diode;

a tenth data representing a third transistor in direct serial connection with the other photosensitive diode;

an eleventh data representing a fourth transistor in direct serial connection with the third transistor;

a twelfth data representing another plurality of frame transfer transistors serially connected thereamongst and in direct serial connection with the fourth transistor; and a thirteenth data representing another transfer gate transistor in direct serial connection with the other plurality of frame transfer transistors and with the transfer gate transistor.

DETAILED DESCRIPTION OF THE INVENTION

Figure 1:
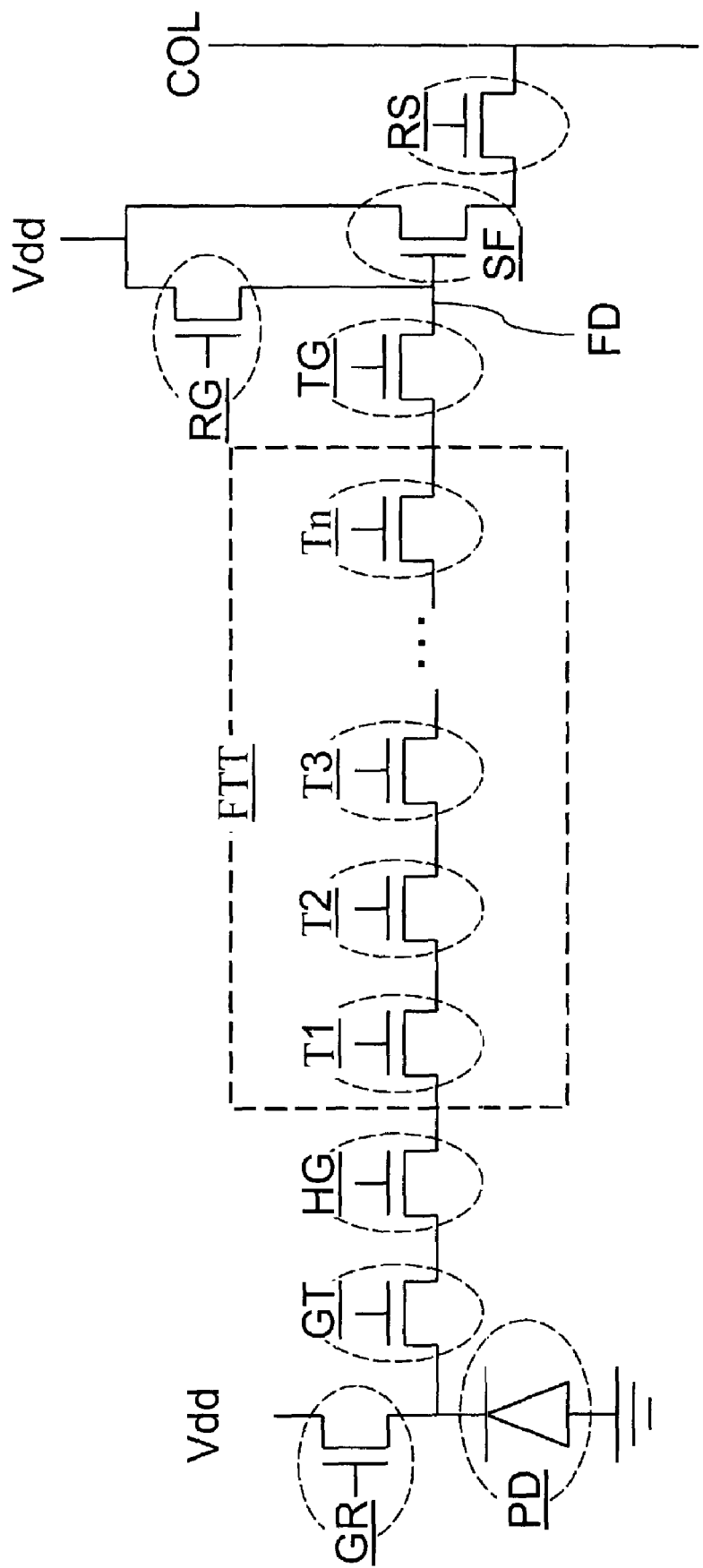
FIG. 1 is a first exemplary semiconductor circuit according to the present invention.

As stated above, the present invention relates to semiconductor circuits including a pixel sensor cell having the capability of storing frames prior to read out, and a design structure for the same, which are now described in detail with accompanying figures. As used herein, when introducing elements of the present invention or the preferred embodiments thereof, the articles "a", "an", "the" and "said" are intended to mean that there are one or more of the elements. Throughout the drawings, the same reference numerals or letters are used to designate like or equivalent elements. Detailed descriptions of known functions and constructions unnecessarily obscuring the subject matter of the present invention have been omitted for clarity. The drawings are not necessarily drawn to scale.

Referring to FIG. 1, a first exemplary semiconductor circuit comprising an image sensor pixel is shown according to the present invention. The first exemplary semiconductor circuit comprises a photosensitive diode PD, a global reset transistor GR, a global transfer transistor GT, a hold gate transistor HG on one end, a transfer gate transistor TG, a reset gate transistor RG, a source follower transistor SF, a row select transistor RS, and a column output line COL on the opposite end, and a plurality of frame transfer transistors FTT located between the hold gate transistor HG and the transfer gate transistor TG.

One end of the photosensitive diode PD is grounded (for an electron-collecting photodiode), while the other end of the photosensitive diode PD is the source of the global reset transistor GR, which is herein referred to as a global reset transistor source, and to the source of the global transfer transistor GT, which is herein referred to as a global transfer transistor source. The source of the global reset transistor GR is the photosensitive diode PD, and the drain of the global reset transistor GR is directly connected to a power supply source Vdd. The terminal of the photodiode PD is also the global transfer transistor source. The drain of the global transfer transistor FT, which is herein referred to as a global transfer transistor, is connected to a source of the hold gate transistor HG, which is herein referred to as a hold gate transistor source.

The drain of the transfer gate transistor TG, which is herein referred to as a transfer gate transistor drain, constitutes a floating diffusion node FD, which is electrically floating while the transfer gate transistor TG and the reset gate transistor are turned off. The floating diffusion node FD is directly connected to the source of the reset gate transistor RG, which is herein referred to a reset gate transistor source, and to the gate of the source follower transistor SF, which is herein referred to the source follower transistor gate. The drain of the reset gate transistor RG and the drain of the source follower transistor SF are connected to the power supply source Vdd. Preferably, the floating drain node FD has a low leakage current to enable storage of charge without changing the quantity of charge significantly.

The gate of the source follower transistor SF is directly connected to the drain of the transfer gate transistor TG, which is the floating drain node FD. The source of the source follower transistor SF is directly connected to the drain of the row select transistor RS, which is herein referred to as a row select transistor drain. The source of the row select transistor RS, which is herein referred to as a row select transistor source, is a "data out" node, or the output node of the image sensor pixel. The data out node is connected to the column output line (COL), which relays the output data column by column.

According to the present invention, the plurality of frame transfer transistors FTT is serially connected between the channel of the hold gate transistor HG and channel of the transfer gate transistor TG. The first of the plurality of frame transfer transistors FTT is herein referred to as a first frame transfer transistor T1. The second of the plurality of frame transfer transistors FTT is herein referred to as a second frame transfer transistor T2. The number of frame transfer transistors in the plurality of frame transfer transistors FTT is herein referred to as the number "n." In general, the i-th of the plurality of frame transfer transistors FTT is herein referred to as an i-th frame transfer transistor Ti, in which i is a positive integer not greater than the total number of the frame transfer transistors, or the number "n."

The channel of the first frame transfer transistors T1 is electrically coupled to the channel of the hold gate transistor. That is, if the gates of both the hold gate transistor and the first frame transfer transistor T1 are held high, the carriers in one channel can easily move to the other. The channel of each of the plurality of frame transfer transistors FTT, i.e., the channel of each of the second through n-th frame transfer transistors, is also directly coupled to the channel of another of the plurality of frame transfer transistors FTT. Specifically, the channel of the i-th frame transfer transistor is coupled to the channel of the (i−1)-th frame transfer transistor for each value of i from 2 to n. Likewise, the channel of the i-th frame transfer transistor is coupled to the channel of the (i+1)-th frame transfer transistor for each value of i from 1 to n−1. All of the plurality of frame transfer transistors FTT are thus coupled in a serial connection amongst the plurality of frame transfer transistors FTT. The channel of the transfer gate transistor is likewise directly coupled to the channel of the n-th frame transfer transistor.

The first exemplary semiconductor circuit may be employed to form an array of image sensors to capture an image. Such an array of image sensors may be employed in any optical, infrared, or ultraviolet imaging device including digital cameras. Each image sensor unit is referred to as a pixel.

Figure 2:
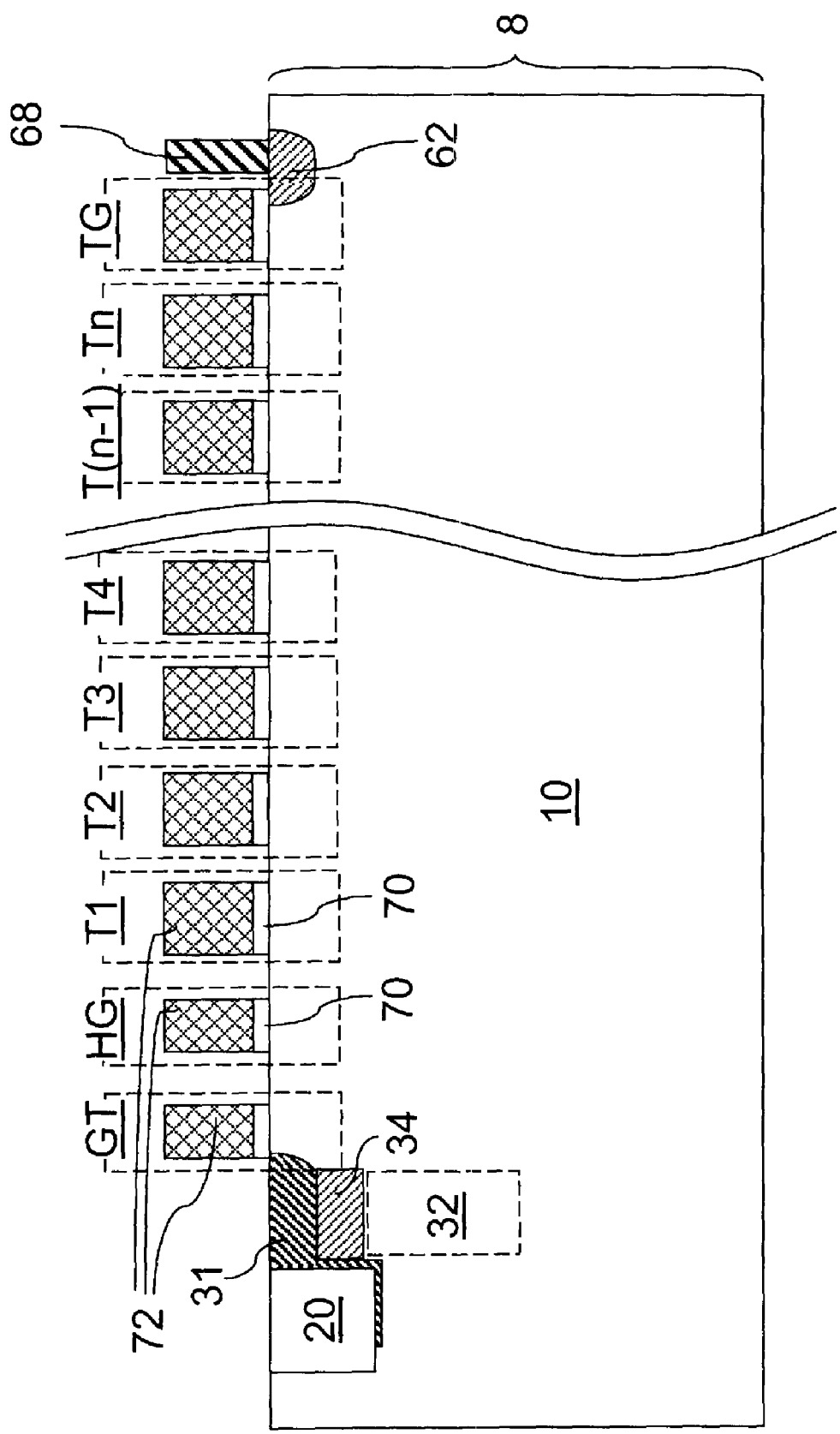
FIG. 2 is a vertical cross-sectional view of a first exemplary semiconductor structure prior to exposure of a photosensitive diode structure (32, 34) to light according to the present invention.

The first exemplary semiconductor circuit of FIG. 1 may be implemented as a semiconductor structure. Referring to FIG. 2, a first exemplary semiconductor structure according to the present invention incorporates portions of the first exemplary semiconductor circuit of FIG. 1. Specifically, the first exemplary semiconductor structure shows physical structures for the global transfer transistor GT, the hold gate transistor HG, the plurality of frame transfer transistors including the first frame transfer transistor T1 up to the n-th frame transfer transistor, and the transfer gate transistor TG.

The first exemplary semiconductor structure comprises a semiconductor substrate 8, which contains a semiconductor layer 10, an isolation structure, in this case shallow trench isolation, 20, a buried doped semiconductor region 32, a first diffusion region 34, and a transfer gate drain region 62. The number n may be any positive integer greater than 1. Diffusion regions between adjacent pairs of transistors are not needed since the transfer of electrical charges is effected in a manner similar to charge transfer in charge coupled devices.

The first exemplary semiconductor structure further comprises gate dielectrics 70 and gate electrodes 72 for a global transfer transistor GT, a hold gate transistor HG, a first frame transfer transistor T1, a second frame transfer transistor T2, . . . , an n-th frame transfer transistor Tn, and a transfer gate transistor TG. A contact via 68 is located directly on the transfer gate drain region 62 to provide electrical contact to a reset gate transistor RG (not shown), a source follower transistor SF (not shown), and a row select transistor RS (not shown) as described in the circuit of FIG. 1.

The semiconductor layer 10 comprises a lightly-doped semiconductor material having a doping of a first conductivity type, which is a low concentration doping with first conductivity type dopants. The first conductivity type is p-type or n-type. For example, the semiconductor layer 10 may have a dopant concentration from about $1.0 \times 10^{14}/cm^3$ to about $1.0 \times 10^{18}/cm^3$, and typically from about $1.0 \times 10^{15}/cm^3$ to about $1.0 \times 10^{17}/cm^3$. The entirety of the semiconductor layer 10 may comprise a single crystalline material. Preferably, the entirety of the semiconductor substrate 8 less the shallow trench isolation structure is single-crystalline. Preferably, the entirety of the semiconductor substrate 8 less the shallow trench isolation structure 20 comprises a same semiconductor material. Non-limiting examples of the semiconductor material include silicon, a silicon germanium alloy portion, silicon, germanium, a silicon-germanium alloy portion, a silicon carbon alloy portion, a silicon-germanium-carbon alloy portion, gallium arsenide, indium arsenide, indium gallium arsenide, indium phosphide, lead sulfide, other III-V compound semiconductor materials, and II-VI compound semiconductor materials.

The buried doped semiconductor region 32 is located directly underneath the first diffusion region 34. The buried doped semiconductor region 32 has a doping of the first conductivity type. The buried semiconductor region 32 has the same doping as, and is a portion of, the semiconductor layer 10.

The first diffusion region 34 has a doping of a second conductivity type, which is the opposite of the first conductivity type. If the first conductivity type is p-type, the second conductivity type is n-type, and vice versa. The dopant concentration of the first diffusion region 34 may be from about $1.0 \times 10^{16}/cm^3$ to about $1.0 \times 10^{20}/cm^3$, and typically from about $1.0 \times 10^{17}/cm^3$ to about $1.0 \times 10^{19}/cm^3$, although lesser and greater dopant concentrations are also explicitly contemplated herein.

The buried doped semiconductor region 32 and the first diffusion region 34 constitute a photosensitive diode structure (32, 34). The buried photosensitive diode structure (32, 34) is a terminal of the photosensitive diode structure (32, 34) and the first diffusion region 34 is another terminal of the photosensitive diode structure (32, 34), which form a p-n junction. When photons impinge on the photosensitive diode structure (32, 34), charge carriers of the second conductivity type accumulate in the first diffusion region 34. Thus, the first diffusion region 34 is also a charge collection well for the photosensitive diode structure (32, 34).

A passivation region 31 having a doping of the first conductivity type may be formed to reduce dark current of the photosensitive diode structure (32, 34). The passivation region is typically electrically connected to semiconductor layer 10 and reduces leakage current from the photosensitive diode structure (32, 34).

The global transfer transistor GT comprises one of the gate dielectrics 70, one of the gate electrodes 72, and is in sufficient proximity to the hold gate HG such that the channels of the two transistors are electrically coupled. That is, if both the GT and HG gates are held high for an n-type transistor, carriers in one channel can move easily to the other. In this way, charge may be transferred from the GT to the HG by modifying the voltages on the gates as a function of time. The buried doped semiconductor region 32 is the source of the global transfer transistor GT.

The hold gate transistor HG comprises another of the gate dielectrics 70, another of the gate electrodes 72 and its channel is electrically coupled to both the channel of the GT and channel of the first frame transfer transistor, T1.

For every positive integer i not greater than n, the i-th frame transfer transistor T1 comprises one of the gate dielectrics 70, one of the gate electrodes 72, and its channel is electrically coupled to the channel of the nearest transistor neighbors. If i is equal to 1, the channel is coupled to both the hold gate, HG, and the second frame transfer transistor, T2. If i is greater than 1, but less than n, the channel of the i-th frame transfer transistor is coupled to the channel of the (i−1)-th frame transfer transistor and the channel of the (i+1)-th frame transfer transistor. If i is equal to n, then the channel of the n-th frame transfer transistor is coupled to the channel of the (n−1)-th frame transfer transistor and the channel of the transfer gate transistor, TG.

The transfer gate transistor TG comprises yet another of the gate dielectrics 70, yet another of the gate electrodes 72, the transfer gate drain region 62, and its channel is coupled to the n-th frame transfer transistor. The transfer gate drain region 62, or the floating diffusion (FD) is the drain of the transfer gate transistor TG.

The first exemplary semiconductor structure constitutes a portion of an image sensor pixel. After depleting the charge in the buried doped semiconductor region 32 by resetting, which may be accomplished by a temporary turn on of the global reset transistor GR (not shown in FIG. 2; refer to FIG. 1), the photosensitive diode PD generates electron-hole pairs in proportion to the number of photons that impinge thereupon. The amount of light impinging on the photosensitive diode PD is quantified by the amount of charge that accumulates in the first diffusion region. All image sensor pixels in the entire array are exposed to photons that impinging thereupon at the same time for the same duration through the operation of a global shutter circuit.

At the end of the exposure, the global transfer transistor GT is turned on to transfer the charges in the buried doped semiconductor region 32 to the channel of the hold gate transistor, HG. The transferred charges are of the second conductivity type, that is holes if the doping type of the buried doped semiconductor region 32, is p-type and electrons if the second conductivity type is n-type. The charge transfer across the global transfer transistor GT is performed essentially simultaneously in a global shutter operation across all the pixels in the image sensor array, hence the name "global transfer" transistor.

Figure 2A:
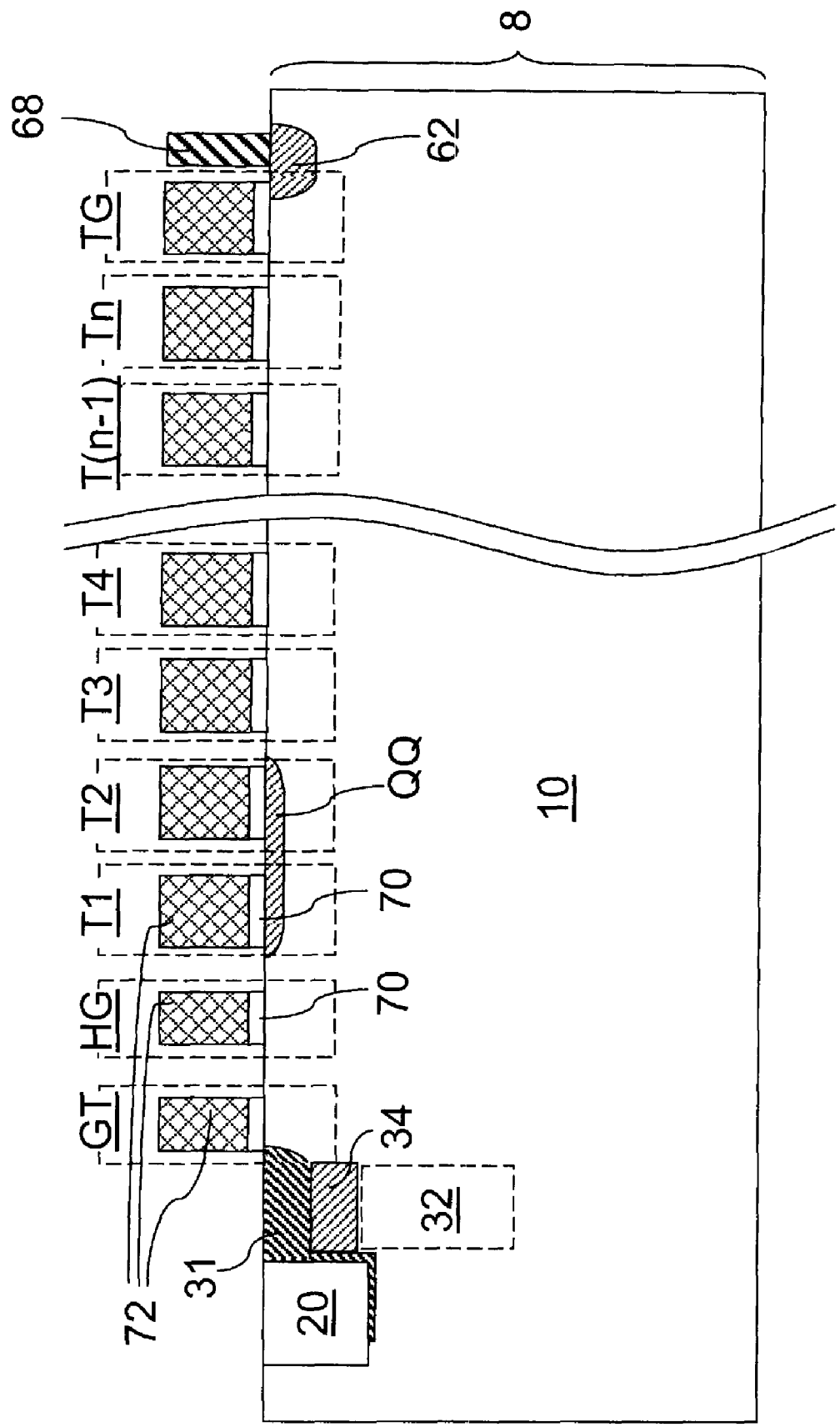
FIG. 2A is a vertical cross-sectional view of the first exemplary semiconductor structure during charge transfer after exposure of the photosensitive diode structure (32, 34) to light according to the present invention.

Referring to FIG. 2A, the charges are transferred to the channel of the hold gate transistor, HG, then serially through the first frame transfer channel, to the second frame transfer channel, . . . , and to the n-th frame transfer channel step by step. The charge from one exposure is stored in one of the frame transfer channel between and including the first frame transfer channel and the n-th frame channel. A set of data corresponding to an image frame is thus stored in a set of i-th frame transfer transistors across the array of the image sensors, in which i is a positive integer not exceeding n. In other words, the collection of the i-th frame transfer transistors within the array of the image sensors stores data for the image frame. The hold gate channel may also be employed to store the data for the image frame prior to the charge transfer into the frame transfer diffusion regions.

Once the data for the image frame, which is hereafter referred to as a first image frame, is stored in the channel of the hold gate, HG, or in the channel of one of the frame transfer transistors by charge transfer, the photosensitive diode structures (32, 34) in the array of image sensors may be exposed again to generate a second image frame. The charges in the buried doped semiconductor region 32 are transferred into the global transfer (GT) channel, into the hold gate (HG) channel, and, eventually, into the channel of one of the frame transfer transistors by successive operation of various transistors, while the data for the first frame is also shifted toward the transfer gate transistor TG by similar charge transfers. Two or more channels of an adjoining group of transistors may be merged to form a merged channel QQ, which holds electrical charges across at least two adjacent transistors, which may include a pair of neighboring frame transfer transistors, the pair of the global transfer transistor GT and the hold gate transistor HG, the pair of the hold gate transistor HG and the first frame transfer transistor T1, or the last (n-th) frame transfer transistor and the transfer gate transistor TG.

More data for additional image frames may be generated by subsequent exposure of the photosensitive diode structures (32, 34) in the array of image sensors followed by shifting of the storage location of each data for the additional image frames by charge transfers toward the transfer gate transistor TG. The number of image frames that may be stored in the frame transfer diffusion regions is determined by the number of the frame transfer transistors (T1-Tn), i.e., the number n and the charge shift scheme employed therein.

The reading of the data from the image pixel by the pixel sensing circuit, which includes the transfer gate transistor TG, the source follower transistor SF, the reset gate transistor RG, and the row select transistor RS (See FIG. 1) may be delayed until multiple image frames are formed and stored in the plurality of frame transfer transistors. In general, the plurality of frame transfer transistors in a serial connection is electrically connected to the photosensitive diode structure (32, 34). The entirety of the array of image sensors may be exposed at least twice prior to reading data from the array of image sensors. A plurality of frames is stored in the plurality of frame transfer transistors. Each of the plurality of frames corresponds to one of the multiple exposures. The plurality of frames within the plurality of frame transfer transistors is shifted away from the photosensitive diode structure (32, 34) toward the transfer gate transistor TG.

The plurality of frames is transferred to the pixel sensing circuit after the multiple exposures. The pixel sensing circuit senses each of the plurality of frames sequentially one by one. Thus, data for image frames is generated image frame by image frame. In other words, readout of one image frame is completed prior to reading out of the next image frame. Within each readout of an image frame among the plurality of frames, the data for an image frame may be transferred to the pixel sensing circuit row by row.

The multiple exposures may be performed sequentially with different exposure times prior to sensing any of the plurality of frames. In this case, the multiple exposures may be performed sequentially without a significant gap between successive exposures, in which the gap is determined by the number of clock cycles needed to transfer charges from the buried doped semiconductor region 32 through the channel of the global transfer (GT) transistor, to the channel of the hold gate (HG) transistor.

Typically, the transfer time determining the gap between exposures is about 1 μs, typically from about 200 ns to a few μs. Thus, a "burst mode" exposure of the array of image sensors is enabled by the present invention. In contrast, the prior art array of CMOS image sensors require a complete readout of an image prior to the next exposure. Since the readout time is typically from about 10 ms to 100 ms, the gap between successive exposures in prior art image sensors is necessary greater than the readout time of the prior art. In the present invention, the gap between successive exposures is from about 100 ns to 1 μs, and consequently, images may be taken in rapid succession without any noticeable time gap between the successive images.

Further, the present invention may be employed to take multiple images in succession with different exposure times. For example, a first image may be taken with 100 ns exposure time, a second image may be taken with 1 μs exposure time, a third image may be taken with 30 μs exposure time, and a fourth image may be taken with 1 ms exposure time. This capability is especially helpful when the brightness of the images has a very wide dynamic range so that capture of a single image by a conventional array of image sensors would result in loss of information either at the extremely bright portions of the image or at the extremely dim portions of the image. Also, when the general level of the brightness of the image is in question, multiple images with different exposure times may be taken so that the optimal images may be retrieved later among the many images that are taken.

The present invention may also be practiced with equal exposure times. In this case, the multiple exposures are performed sequentially with a same exposure time prior to sensing any of the plurality of frames. This capability is useful since the dynamic range of the images may be enhanced by averaging over may picture frames that are taken in rapid succession. For example, averaging over two image frames results in an increase of the dynamic range by 3 dB. Averaging over four image frames results in an increase of the dynamic range by 6 dB.

According to another embodiment of the present invention, all or some of the plurality of frame transfer transistors (T1-Tn) may be turned on to electrically merge, or "gang," all or some of the frame transfer diffusion regions to provide a large capacitance charge storage region. In this case, the charge holding capacity for an image frame is increased. In this mode of operation, due to the increase of the amount of charge that may be stored in an image pixel, the dynamic range of an image frame increases, resulting in a high fidelity images from the array of image sensor of the present invention.

The transfer of charges within the plurality of frame transfer transistors (T1-Tn) may be effected in a variety of charge transfer schemes. Non-limiting exemplary methods are illustrated herein to describe the present invention. It is explicitly contemplated herein, however, that other charge transfer schemes may be employed to transfer the set of charges in the plurality of frame transfer transistors (T1-Tn) away from the photosensitive diode structure (32, 34) toward the transfer gate transistor TG.

Figure 3:
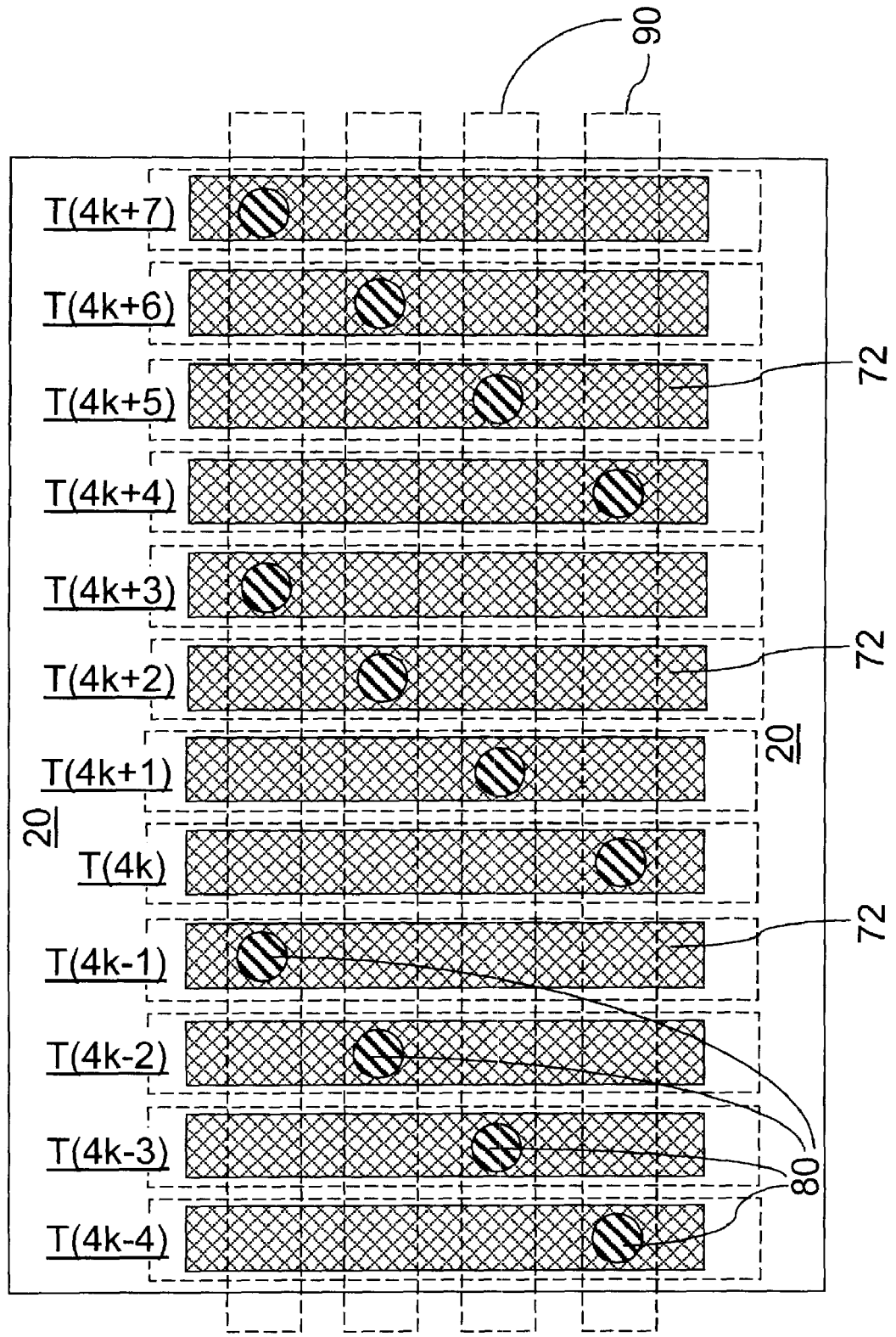
FIG. 3 is a top-down view of a second exemplary semiconductor structure according to an embodiment of the present invention.

Referring to FIG. 3, a second exemplary semiconductor structure according to an embodiment of the present invention comprises frame transfer transistor channels surrounded by an isolation structure 20. The frame transfer transistor channels correspond to the collection of the first frame transfer diffusion region 51, the second frame transfer diffusion region 52, . . . , and the n-th frame transfer diffusion region 59 of FIG. 2. One of the gate electrodes 72 overlies a gap between each pair of adjacently located frame transfer transistor channels. Each of the frame transfer transistors Ti, in which i is an integer not greater than n, comprises transistor channelsa channel that is electrically coupled to the channels of the adjacent transistors. In the second exemplary semiconductor structure, the frame transfer transistors T1 includes a (4k−4)-th frame transfer transistor through a (4k+7)-th frame transfer transistor, in which k is an integer, 4k−4 is positive, and 4k+7 does not exceed n.

A set of four metal lines 90 overlies the gate electrodes 72 transistor channels and their associated inversion channels. Typically, the set of four metal lines 90 are separated from the gate electrodes 72 transistor channels by a dielectric layer (not shown). Each of the set of four metal lines 90 connects gate electrodes 72 of every fourth frame transfer transistor among the plurality of frame transfer transistors through metal vias 80. Typically, each metal via 80 vertically abuts a top surface of a gate electrode 72 and a bottom surface of one of the set of four metal lines 90. The plurality of frame transfer transistors is classified into four disjoined subsets of frame transfer transistors. Each frame transfer transistor belongs to one of the four subsets. Each of the four metal lines 90 connects all frame transfer transistors in the same subset of the plurality of frame transfer transistors. Each of the four metal lines 90 connects a different subset of the plurality of frame transfer transistors.

Figure 4A:
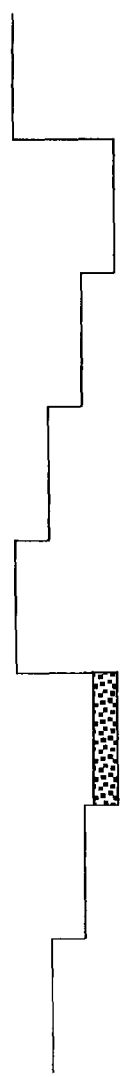
FIGS. 4A and 4B are schematic diagrams of potential wells formed by a plurality of frame transfer transistors in a two-phase charge shifting scheme.
Figure 4B:
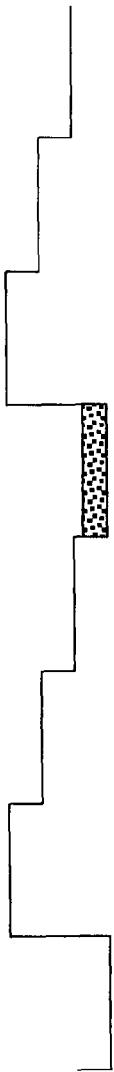

Referring to FIGS. 4A and 4B, schematic diagrams of potential wells are shown for a two-phase charge shifting scheme. The potential wells are formed by the plurality of frame transfer transistors. Each potential well corresponds to one of the frame transfer channel regions which are dynamically formed by modulating the potential of the frame transfer transistor gates. Each of the four metal lines 90 (See FIG. 3) are biased at a different voltage to form the pattern of potential wells in FIG. 4A. Electrons present in one of the potential wells are schematically represented by a dotted area in the schematic diagram. Referring to FIG. 4B, the electrons are shifted by two frame transfer channel regions (See FIG. 3) by changing the bias to the four metal lines 90 in the next clock cycle. In the following clock cycle, the pattern of the electrical bias to the four metal lines 90 is changed back to the pattern of FIG. 4A, which induces further shift of the electrons by two more frame transfer channel regions.

In this case, every other frame transfer transistor channel regions, which is herein collectively referred to as a first subset of the frame transfer channels, store the electrical charge, while the remaining frame transfer transistor channels, which is herein collectively referred to as a second subset of the frame transfer transistor channels, only pass the electrical charge. In one embodiment, each of the transfer transistor channels in the first subset are formed large enough to hold the electrical charges, while each of the transfer transistor channels in the second subset are formed in a smaller size since the charge is not stored therein.

Figure 5A:
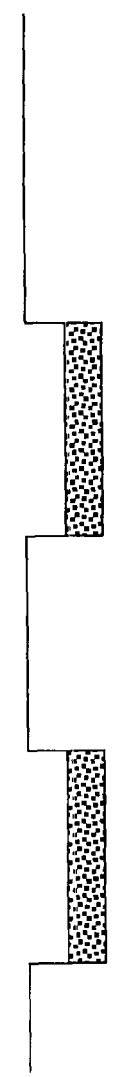
FIGS. 5A-5D are schematic diagrams of potential wells formed by a plurality of frame transfer transistors in a four-phase charge shifting scheme.
Figure 5B:
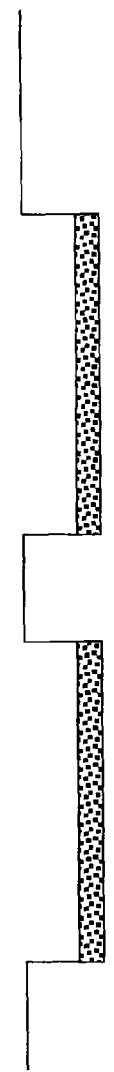
Figure 5C:
Figure 5D:
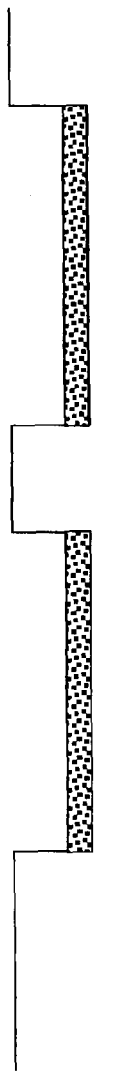

Referring to FIGS. 5A-5D, schematic diagrams of potential wells are shown for a four-phase charge shifting scheme. The potential wells are formed by the plurality of frame transfer transistors. Each potential well corresponds to one of the frame transfer transistor channels in FIG. 3. Each of the four metal lines 90 (See FIG. 3) are biased at one of two different voltages to form the pattern of potential wells in FIG. 5A. Electrons are present in two pairs of adjoined potential wells are schematically represented by two dotted areas in the schematic diagram. Each dotted area represents a pair of adjacent, coupled frame transfer transistor channels (See FIG. 3). Referring to FIG. 5B, the electrons are spread over three adjacent frame transfer transistor channelst by changing the bias to the four metal lines 90 in the next clock cycle. In the following clock cycle corresponding to FIG. 5C, the pattern of the electrical bias to the four metal lines 90 is changed again so that the electrons are confined within different pairs of adjacent frame transfer transistor channels. Compared to the pattern in FIG. 5A, the electrons have shifted by one frame transfer transistor channels. Referring to FIG. 5D, the electrons are again spread over three adjacent frame transfer transistor channels by changing the bias to the four metal lines 90 in the next clock cycle. Compared to the pattern in FIG. 5B, the electrons have shifted by one frame transfer transistor channels. This sequence is repeated to transfer the electrons by one frame transfer transistor channels per two clock cycles.

In this case, charges are stored in each frame transfer transistor channels during the charge transfer process. Therefore, all of the frame transfer transistor channels are large enough to hold the amount of the charges that are transferred.

Figure 6:
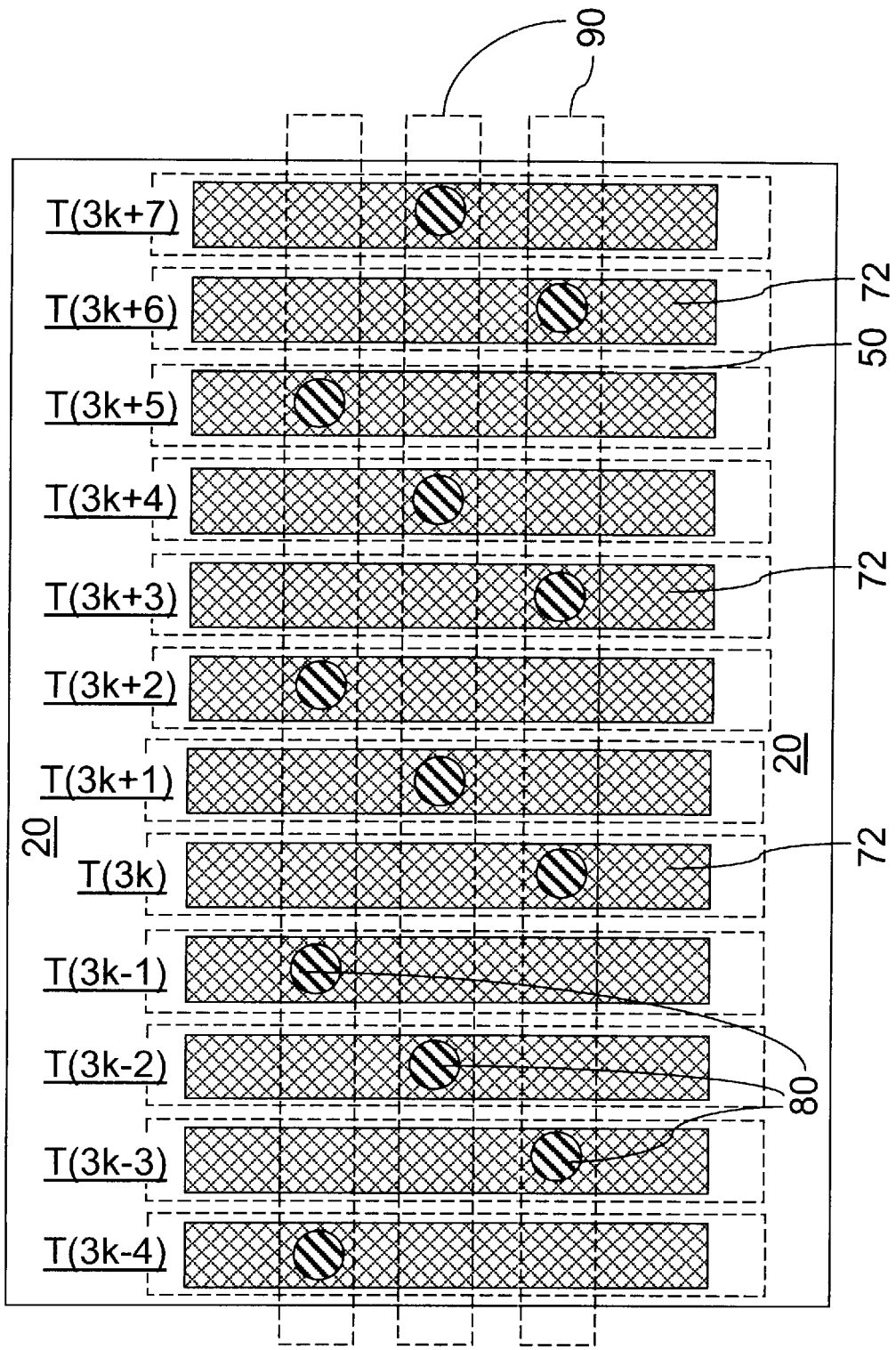
FIG. 6 is a top-down view of a third exemplary semiconductor structure according to another embodiment of the present invention.

Referring to FIG. 6, a third exemplary semiconductor structure according to another embodiment of the present invention comprises frame transfer transistor channels surrounded by an isolation structure 20. The frame transfer transistor channels correspond to the collection of the first frame transfer diffusion region 51, the second frame transfer diffusion region 52, . . . , and the n-th frame transfer diffusion region 59 of FIG. 2. Each of the gate electrodes 72 overlies a frame transfer transistor channel which can be electrically coupled each of the adjacent frame transfer transistor channels. In the second exemplary semiconductor structure, the frame transfer transistors T1 includes a (3k−4)-th frame transfer transistor through a (3k+7)-th frame transfer transistor, in which k is an integer, 3k−4 is positive, and 3k+7 does not exceed n.

A set of three metal lines 90 overlies the gate electrodes 72 and the frame transfer transistor channels. Typically, the set of three metal lines 90 are separated from the gate electrodes 72 and the frame transfer transistor channels by a dielectric layer (not shown). Each of the set of three metal lines 90 connects gate electrodes 72 of every third frame transfer transistor among the plurality of frame transfer transistors through metal vias 80. Typically, each metal via 80 vertically abuts a top surface of a gate electrode 72 and a bottom surface of one of the set of four metal lines 90. The plurality of frame transfer transistors is classified into three disjoined subsets of frame transfer transistors. Each frame transfer transistor belongs to one of the three subsets. Each of the three metal lines 90 connects all frame transfer transistors in the same subset of the plurality of frame transfer transistors. Each of the three metal lines 90 connects a different subset of the plurality of frame transfer transistors.

Figure 7A:
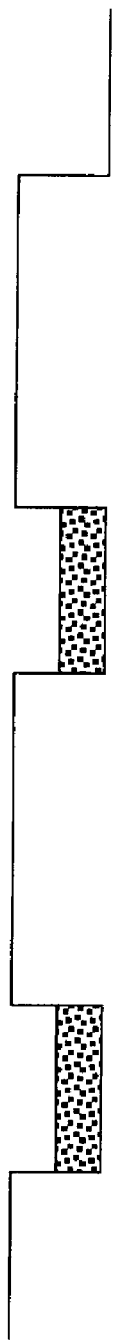
FIGS. 7A, 7B, and 7C are schematic diagrams of potential wells formed by a plurality of frame transfer transistors in a three-phase charge shifting scheme.
Figure 7B:
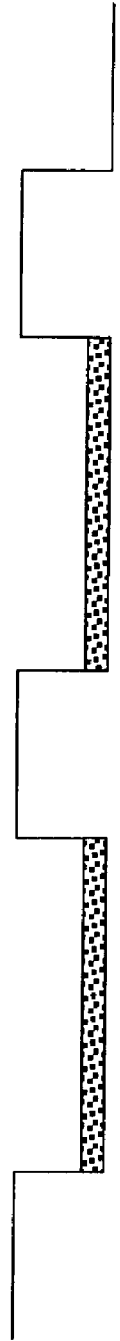
Figure 7C:
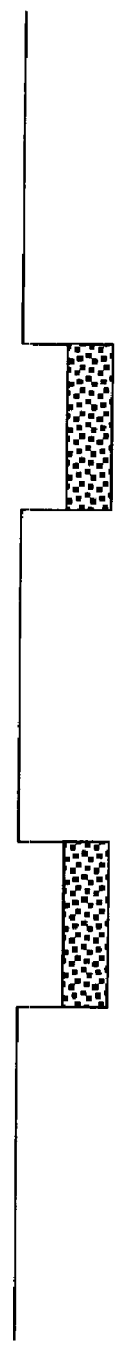

Referring to FIGS. 7A-7C, schematic diagrams of potential wells are shown for a three-phase charge shifting scheme. The potential wells are formed by the plurality of frame transfer transistors. Each potential well corresponds to one of the frame transfer transistor channels in FIG. 6. Each of the three metal lines 90 (See FIG. 6) are biased at one of two different voltages to form the pattern of potential wells in FIG. 7A. Electrons present in one of the potential wells are schematically represented by a dotted area in the schematic diagram. Referring to FIG. 4B, the electrons are spread over two adjoining frame transfer transistor channels (See FIG. 6) by changing the bias to the three metal lines 90 in the next clock cycle. In the following clock cycle corresponding to FIG. 7C, the pattern of the electrical bias to the three metal lines 90 is changed so that the electrons are confined in one of the two adjoining frame transfer transistor channels that is closer to the transfer gate transistor TG (See FIG. 2). Compared to FIG. 7A, the electrons have shifted by one frame transfer transistor channels.

In this case, charges are stored in each frame transfer transistor channels during the charge transfer process. Therefore, all of the frame transfer transistor channels are large enough to hold the amount of the charges that are transferred.

Figure 8:
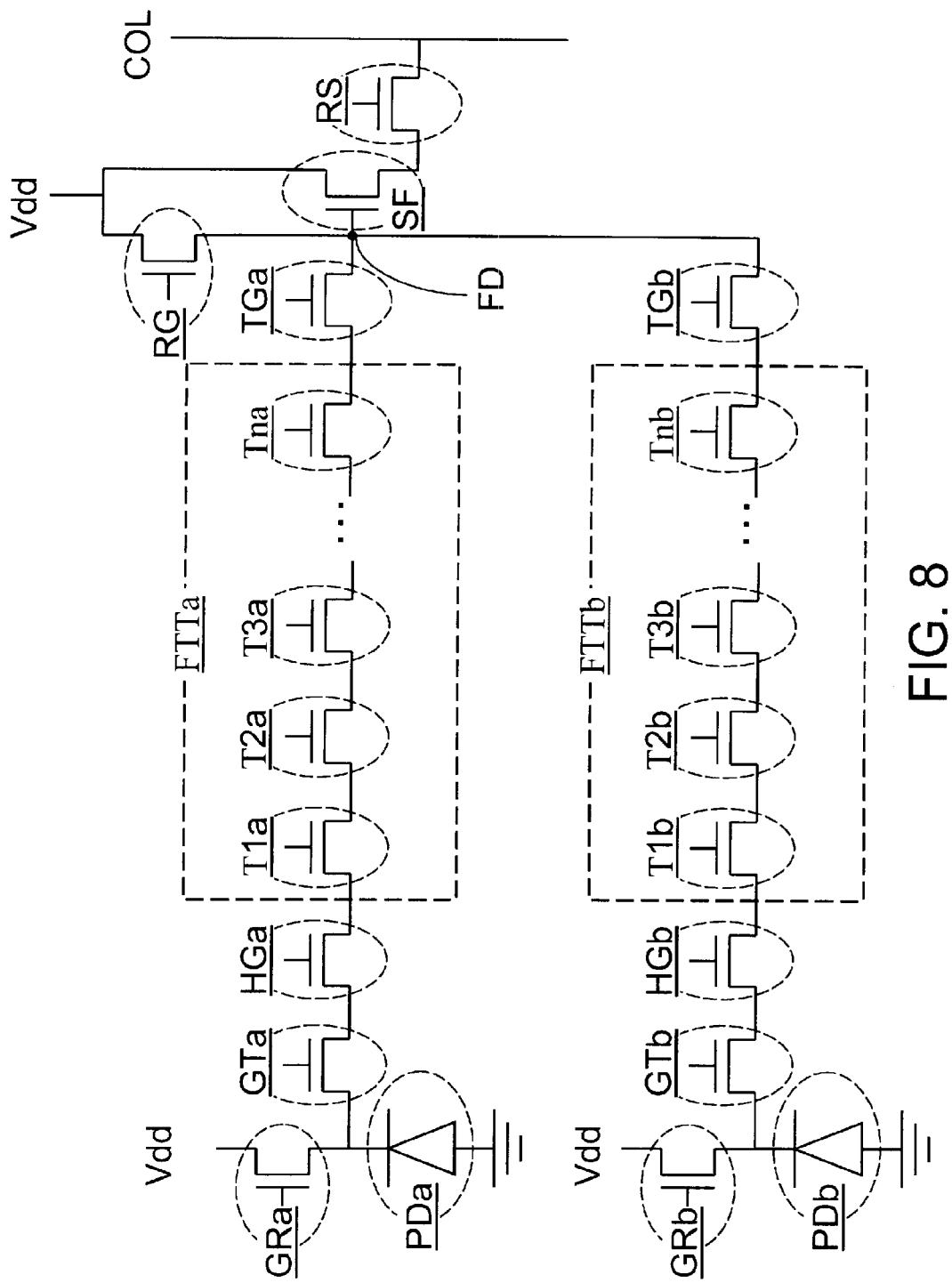
FIG. 8 is a schematic diagram of a second exemplary semiconductor circuit according to the present invention.

The pixel sensing circuit and the floating drain node FD of FIG. 1 may be shared with at least another set of photodiodes and at least another set of frame shift transistors FTT. Referring to FIG. 8, a second exemplary semiconductor circuit according to the present invention comprises a first photosensitive diode PDa, a first global transfer transistor GTa, a first hold gate transistor HGa, a first plurality of frame transfer transistors FTTa, and a first transfer gate transistor TGa, which are connected in a series connection. A first global reset transistor GRa is connected to a terminal of the first photosensitive diode PDa and the source of the first global transfer transistor GTa. Each of these elements has the same function as the corresponding element in FIG. 1.

The second exemplary semiconductor circuit according to the present invention further comprises a second photosensitive diode PDb, a second global transfer transistor GTb, a second hold gate transistor HGb, a second plurality of frame transfer transistors FTTb, and a second transfer gate transistor TGb, which are connected in a series connection. A second global reset transistor GRb is connected to a terminal of the second photosensitive diode PDa and the source of the second global transfer transistor GTb. Each of these elements has the same function as the corresponding element in FIG. 1.

The second exemplary semiconductor circuit further comprises a pixel sensing circuit, which includes a reset gate transistor RG, a source follower transistor SF, a row select transistor RS, and a column output line COL. The pixel sensing circuit has the same function and configuration as in FIG. 1.

The drain of the first transfer gate TGa and the drain of the second transfer gate TGb are electrically tied as a floating drain node FD, which is tied to the gate of the source follower transistor. The floating drain node FD may be physically implemented as a single diffusion region, which is controlled by the gate of the first transfer gate TGa and the gate of the second transfer gate TGb. By sharing the pixel sensing circuit, the areal density of the array of image sensors may be increased.

Figure 9:
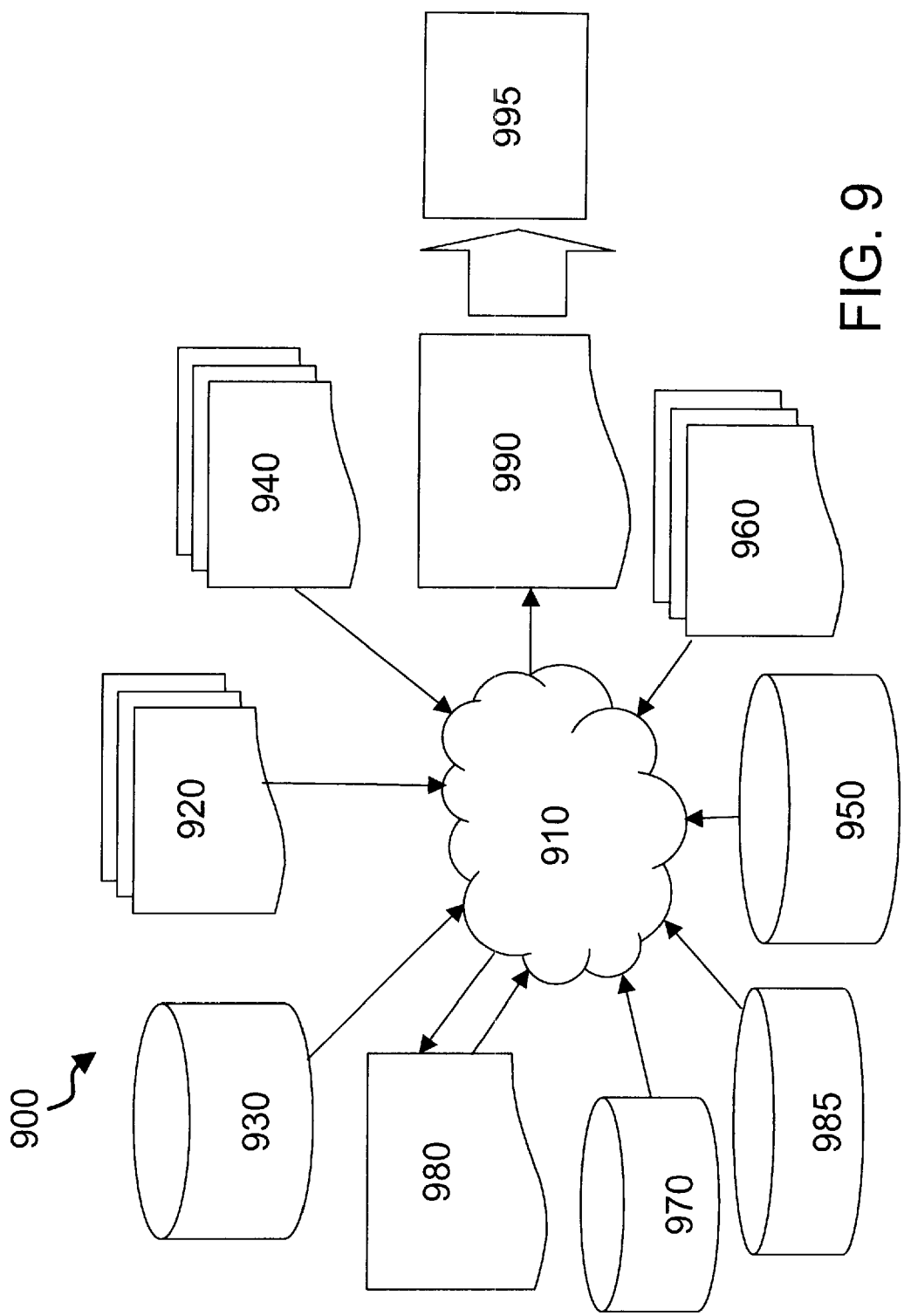
FIG. 9 is a flow diagram of a design process used in semiconductor design and manufacture of the semiconductor circuits according to the present invention.

FIG. 9 shows a block diagram of an exemplary design flow 900 used for example, in semiconductor design and manufacturing of the semiconductor circuit according to the present invention. Design flow 900 may vary depending on the type of integrated circuit (IC) being designed. For example, a design flow for building an application specific integrated circuit (ASIC) may differ from a design flow for designing a standard integrated circuit component. Design structure 920 is preferably an input to a design process 910 and may come from an intellectual property (IP) provider, a core developer, or a design company, or may be generated by the operator of a design flow, or may come from other sources.

Design structure 920 comprises an embodiment of present invention as shown in any of FIGS. 1-3, 6, and 8 in the form of schematics or hardware description language (HDL; e.g. Verilog, VHDL, C, etc.) The design structure 920 may be contained on one or more machine readable medium. For example, design structure 920 may be a text file or a graphical representation of an embodiment of the invention as shown in FIGS. 1-3, 6, and 8.

For example, the design structure may comprise:
a first data representing a photosensitive diode (PD or PDa; See FIGS. 1 and 8);
a second data representing a first transistor, which is a global transfer transistor (GT or GTa; See FIGS. 1 and 8), in direct serial connection with the photosensitive diode;
a third data representing a second transistor, which is a hold gate transistor (HG or HGa; See FIGS. 1 and 8), in direct serial connection with the first transistor; and
a fourth data representing a plurality of frame transfer transistors (FTT or FTTa; See FIGS. 1 and 8) serially connected thereamongst and in direct serial connection with the second transistor;
a fifth data, which may represent an electrical connection between gate electrodes of every fourth frame transfer transistor among the plurality of frame transfer transistors as illustrated in FIG. 3, wherein gates of adjoining frame transfer transistors are electrically disconnected, or may represent an electrical connection between gate electrodes of every third frame transfer transistor among the plurality of frame transfer transistors as in FIG. 6, wherein gates of adjoining frame transfer transistors are electrically disconnected;
a sixth data representing a global reset transistor (GT or GTa; See FIGS. 1 and 8) directly connected to the photosensitive diode a power supply source;
a seventh data representing a transfer gate transistor (TG or TGa; See FIGS. 1 and 8) in direct serial connection with a plurality of frame transfer transistors;
an eighth data representing a source follower transistor (SF or SFa; See FIGS. 1 and 8), wherein a gate of the source follower transistor is directly connected to a drain of the transfer gate transistor;
an optional ninth data representing another photosensitive diode (PDb; See FIG. 8);
an optional tenth data representing a third transistor, which is another global transfer transistor (GTb; See FIG. 8), in direct serial connection with the other photosensitive diode;
an optional eleventh data representing a fourth transistor, which is another hold gate transistor (HGb; See FIG. 8), in direct serial connection with the third transistor;
an optional twelfth data representing another plurality of frame transfer transistors (FTTb; See FIG. 8) serially connected thereamongst and in direct serial connection with the fourth transistor; and
an optional thirteenth data representing another transfer gate transistor (TGb; See FIG. 8) in direct serial connection with the other plurality of frame transfer transistors and with the transfer gate transistor.

Design process 910 preferably synthesizes (or translates) an embodiment of the invention as show in FIGS. 1-3, 6, and 8 into a netlist 980, where netlist 980 is, for example, a list of wires, transistors, logic gates, control circuits, I/O, models, etc. that describes the connections to other elements and circuits in an integrated circuit design and recorded on at least one of machine readable medium. For example, the medium may be a CD, a compact flash, other flash memory, a packet of data to be sent via the Internet, or other networking suitable means. The synthesis may be an iterative process in which the netlist 980 is resynthesized one or more times depending on design specifications and parameters for the circuit.

The design process 910 may include using a variety of inputs; for example, inputs from library elements 930 which may house a set of commonly used elements, circuits, and devices, including models, layouts, and symbolic representations, for a given manufacturing technology (e.g., different technology nodes such as 32 nm, 45 nm, and 90 nm, etc.), design specifications 940, characterization data 950, verification data 960, design rules 970, and test data files 985 (which may include, for example, standard circuit design processes such as timing analysis, verification, design rule checking, place and route operations, etc. One of ordinary skill in the art of integrated circuit design can appreciate the extent of possible electronic design automation tools and applications used in the design process 910 without deviating from the scope and spirit of the present invention. The design structure of the present invention is not limited to any specific design flow.

Design process 910 preferably translates an embodiment of the invention as shown in FIG. 2, along with any additional integrated circuit deign or data (if applicable), into a second design structure 990. Design structure 990 resides on a storage medium in a data format used for the exchange of layout data of integrated circuits and/or symbolic data format (e.g., information stored in GDSII (GDS2), GL1, OASIS, map files, or any other suitable format for storing such design structures). Design structure 990 may comprise information such as, for example, symbolic data, map files, test data files, design content files, manufacturing data, layout parameters, wires, levels of metal, vias, shapes, data for routing though the manufacturing line, and any other data required by a semiconductor manufacturer to produce one of the embodiments of the present invention as shown in FIGS. 1-3, 6, and 8. Design structure 990 may then proceed to a stage 995 where, for example, design structure 990 proceeds to tape-out, is released to manufacturing, is released to a mask house, is sent to another design house, is sent back to a customer, etc.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

What is claimed is:

1. A semiconductor structure for a complementary metal oxide semiconductor (CMOS) image sensor pixel, said semiconductor structure comprising:
a photosensitive diode structure;
a first transistor including a diffusion region and a first channel, wherein said diffusion region is a source region of said first transistor and is of integral construction with a terminal of said photosensitive diode structure;
a second transistor including a second channel located in proximity to said first channel, wherein said second channel is electrically coupled to said first channel to enable formation of a merged channel including said first channel and said second channel;

a plurality of frame transfer transistors including a plurality of frame transfer channels and configured to store a plurality of frames therein, wherein each of said plurality of frame transfer transistors is serially connected among one another and comprises a gate electrode and a frame transfer channel, and wherein each of said plurality of frame transfer channels is located in proximity with another of said plurality of frame transfer channels to enable formation of a merged channel including two neighboring frame transistor channels; and a set of four metal lines and a set of metal vias, wherein each of said set of four metal lines connects gate electrodes of every fourth frame transfer transistor among said plurality of frame transfer transistors through a subset of said metal vias, and wherein each of said four metal lines connects a different subset of said plurality of frame transfer transistors.

2. The semiconductor structure of claim 1, further comprising a global reset transistor including a global reset transistor source region directly connected to said terminal of said photosensitive diode and a global reset transistor drain region directly connected to a power supply source.

3. The semiconductor structure of claim 1, further comprising:
a transfer gate transistor including a transfer gate channel located in proximity with a last frame transfer channel to enable formation of another merged channel including said last frame transistor channel and said transfer gate channel; and
a source follower transistor including a source follower transistor gate electrode connected to a floating diffusion region by a set of metal interconnect structures.

4. The semiconductor structure of claim 3, further comprising:
another photosensitive diode structure;
a third transistor including another diffusion region and a third channel, wherein said other diffusion region is a source region of said third transistor and is of integral construction with a terminal of said other photosensitive diode structure;
a fourth transistor including a fourth channel located in proximity to said third channel, wherein said fourth channel is electrically coupled to said third channel to enable formation of another merged channel including said third channel and said fourth channel; and
another plurality of frame transfer transistors including another plurality of frame transfer channels, wherein each of said other plurality of frame transfer transistors is serially connected among one another and comprises a gate electrode and a frame transfer channel, and wherein each of said other plurality of frame transfer channels is located in proximity with another of said other plurality of frame transfer channels to enable formation of a merged channel including two neighboring frame transistor channels; and
another transfer gate transistor including another transfer gate channel located in proximity with another last frame transfer channel to enable formation of another merged channel including said other last frame transistor channel and said other transfer gate channel.

5. A semiconductor structure for a complementary metal oxide semiconductor (CMOS) image sensor pixel, said semiconductor structure comprising:
photosensitive diode structure;
a first transistor including a diffusion region and a first channel, wherein said diffusion region is a source region of said first transistor and is of integral construction with a terminal of said photosensitive diode structure;
a second transistor including a second channel located in proximity to said first channel, wherein said second channel is electrically coupled to said first channel to enable formation of a merged channel including said first channel and said second channel;
a plurality of frame transfer transistors including a plurality of frame transfer channels and configured to store a plurality of frames therein, wherein each of said plurality of frame transfer transistors is serially connected among one another and comprises a gate electrode and a frame transfer channel, and wherein each of said plurality of frame transfer channels is located in proximity with another of said plurality of frame transfer channels to enable formation of a merged channel including two neighboring frame transistor channels; and
a set of three metal lines and a set of metal vias, wherein each of said set of three metal lines connects gate electrodes of every third frame transfer transistor among said plurality of frame transfer transistors through a subset of said metal vias, and wherein each of said three metal lines connects a different subset of said plurality of frame transfer transistors.

6. A semiconductor circuit for a complementary metal oxide semiconductor (CMOS) image sensor pixel, said semiconductor circuit comprising:
a photosensitive diode;
a first transistor having a first channel, wherein a source of said first transistor is a terminal of said photosensitive diode;
a second transistor having a second channel which is configured to enable formation of a merged channel including said first channel and said second channel; and
a plurality of frame transfer transistors including a plurality of frame transfer channels and configured to store a plurality of frames therein, wherein each of said plurality of frame transfer transistors is serially connected among one another and comprises a gate electrode and a frame transfer channel, and wherein each neighboring pair of said plurality of frame transfer channels is configured to enable formation of a merged channel including two neighboring frame transistor channels, wherein gates of every third frame transfer transistor among said plurality of frame transfer transistors are electrically shorted, and wherein gates of adjoining frame transfer transistors are electrically disconnected.

7. The semiconductor circuit of claim 6, further comprising a global reset transistor, wherein a source of said global reset transistor is directly connected to said terminal of said photosensitive diode and a drain of said global reset transistor drain is directly connected to a power supply source.

8. The semiconductor circuit of claim 6, further comprising:
a transfer gate transistor including a transfer gate channel configured to enable formation of another merged channel including a last frame transistor channel and said transfer gate channel; and
a source follower transistor, wherein a gate of said source follower transistor is directly connected to a drain of said transfer gate transistor.

9. The semiconductor circuit of claim 8, further comprising:
another photosensitive diode;
a third transistor having a third channel, wherein a source of said third transistor is a terminal of said other photosensitive diode;

a fourth transistor having a fourth channel which is configured to enable formation of another merged channel including said third channel and said fourth channel;

another plurality of frame transfer transistors including another plurality of frame transfer channels, wherein each of said other plurality of frame transfer transistors is serially connected among one another and comprises a gate electrode and a frame transfer channel, and wherein each neighboring pair of said other plurality of frame transfer channels is configured to enable formation of a merged channel including two neighboring frame transistor channels; and another transfer gate transistor including another transfer gate channel configured to enable formation of yet another merged channel including another last frame transistor channel and said other transfer gate channel.

10. A semiconductor circuit for a complementary metal oxide semiconductor (CMOS) image sensor pixel, said semiconductor circuit comprising:
a photosensitive diode;
a first transistor having a first channel, wherein a source of said first transistor is a terminal of said photosensitive diode;
a second transistor having a second channel which is configured to enable formation of a merged channel including said first channel and said second channel; and
a plurality of frame transfer transistors including a plurality of frame transfer channels and configured to store a plurality of frames therein, wherein each of said plurality of frame transfer transistors is serially connected among one another and comprises a gate electrode and a frame transfer channel, and wherein each neighboring pair of said plurality of frame transfer channels is configured to enable formation of a merged channel including two neighboring frame transistor channels., wherein gates of every fourth frame transfer transistor among said plurality of frame transfer transistors are electrically shorted, and wherein gates of adjoining frame transfer transistors are electrically disconnected.

11. A machine readable non-transitory storage medium embodying a design structure for designing, manufacturing, or testing a design for a complementary metal oxide semiconductor (CMOS) image sensor pixel configured to store a plurality of frames in a plurality of frame transfer transistors, said design structure comprising:
a first data representing a photosensitive diode;
a second data representing a first transistor in direct serial connection with said photosensitive diode, wherein said first transistor having a first channel, and wherein a source of said first transistor is a terminal of said photosensitive diode;
a third data representing a second transistor in direct serial connection with said first transistor, wherein said second transistor having a second channel configured to enable formation of a merged channel including said first channel and said second channel;
a fourth data representing a plurality of frame transfer transistors serially connected thereamongst and configured to store a plurality of frames therein and in direct serial connection with said second transistor; and
a fifth data representing an electrical connection between gate electrodes of every fourth frame transfer transistor among said plurality of frame transfer transistors, wherein gates of adjoining frame transfer transistors are electrically disconnected.

12. The machine readable non-transitory storage medium of claim 11, wherein said design structure comprises a netlist.

13. The machine readable non-transitory storage medium of claim 11, wherein said design structure resides on storage medium as a data format used for exchange of layout data of integrated circuits.

14. The machine readable non-transitory storage medium of claim 11, further comprising a sixth data representing a global reset transistor directly connected to said photosensitive diode a power supply source.

15. The machine readable non-transitory storage medium of claim 11, further comprising:
a seventh data representing a transfer gate transistor in direct serial connection with a plurality of frame transfer transistors; and
an eighth data representing a source follower transistor, wherein a gate of said source follower transistor is directly connected to a drain of said transfer gate transistor.

16. The machine readable non-transitory storage medium of claim 15, further comprising:
a ninth data representing another photosensitive diode;
a tenth data representing a third transistor in direct serial connection with said other photosensitive diode;
an eleventh data representing a fourth transistor in direct serial connection with said third transistor;
a twelfth data representing another plurality of frame transfer transistors serially connected thereamongst and in direct serial connection with said fourth transistor; and
a thirteenth data representing another transfer gate transistor in direct serial connection with said other plurality of frame transfer transistors and with said transfer gate transistor.

17. A machine readable non-transitory storage medium embodying a design structure for designing, manufacturing, or testing a design for a complementary metal oxide semiconductor (CMOS) image sensor pixel configured to store a plurality of frames in a plurality of frame transfer transistors, said design structure comprising:
a first data representing a photosensitive diode;
a second data representing a first transistor in direct serial connection with said photosensitive diode, wherein said first transistor having a first channel, and wherein a source of said first transistor is a terminal of said photosensitive diode;
a third data representing a second transistor in direct serial connection with said first transistor, wherein said second transistor having a second channel configured to enable formation of a merged channel including said first channel and said second channel;
a fourth data representing a plurality of frame transfer transistors serially connected thereamongst and configured to store a plurality of frames therein and in direct serial connection with said second transistor; and
a fifth data representing an electrical connection between gate electrodes of every third frame transfer transistor among said plurality of frame transfer transistors, wherein gates of adjoining frame transfer transistors are electrically disconnected.

\* \* \* \* \*